May 5, 1964
C. A. PETERSON
3,131,909
REMOTE CONTROL STEERING DEVICE
Filed June 5, 1961
2 Sheets-Sheet 1
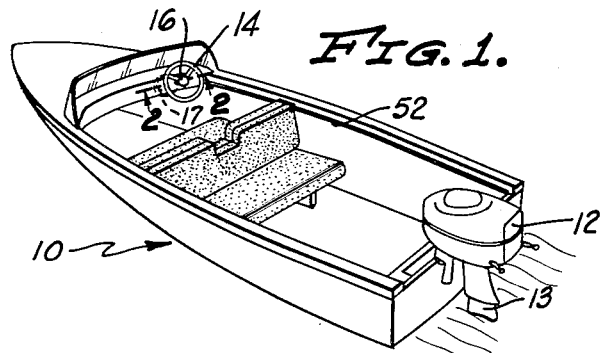
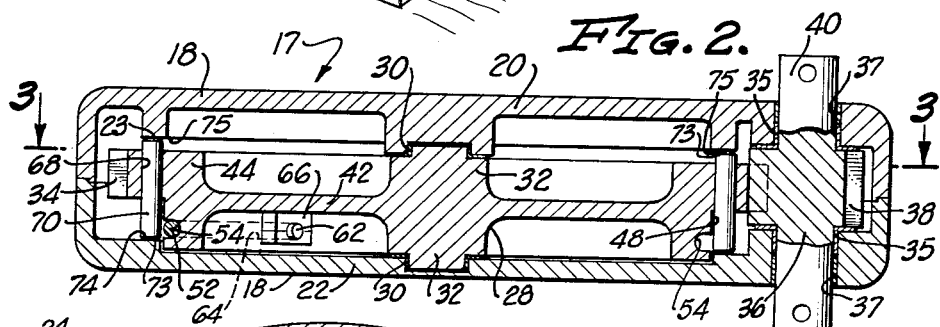
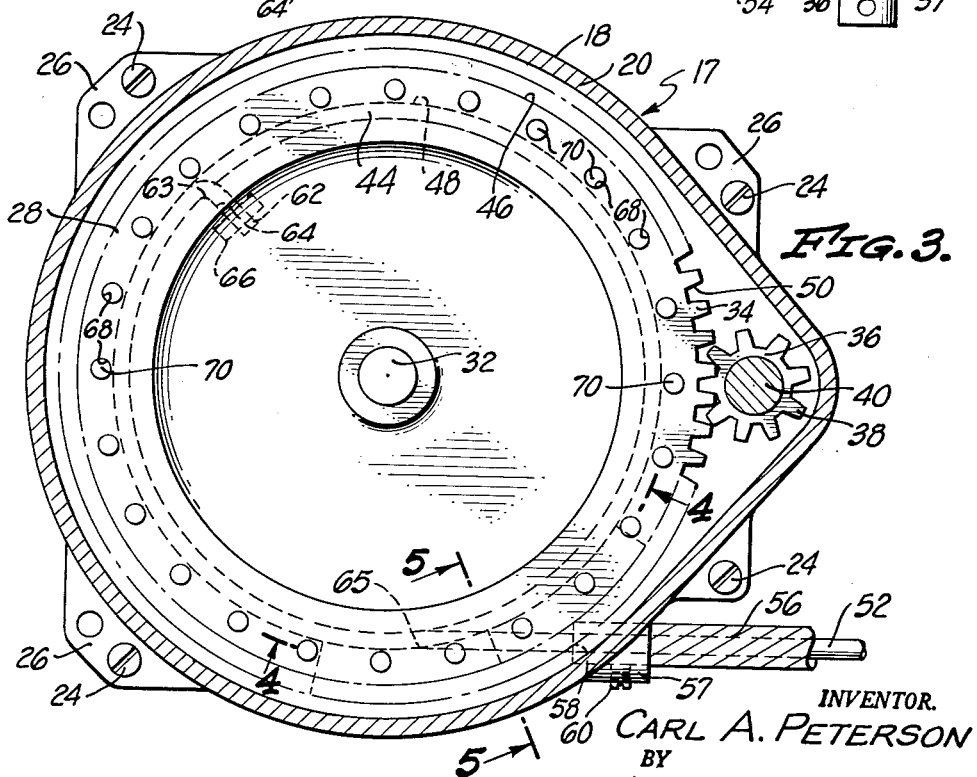
INVENTOR.
CARL A. PETERSON
BY
O'BRIAN & BLACKHAM
ATTORNEYS May 5, 1964  C. A. PETERSON  3,131,909
REMOTE CONTROL STEERING DEVICE
Filed June 5, 1961  2 Sheets-Sheet 2
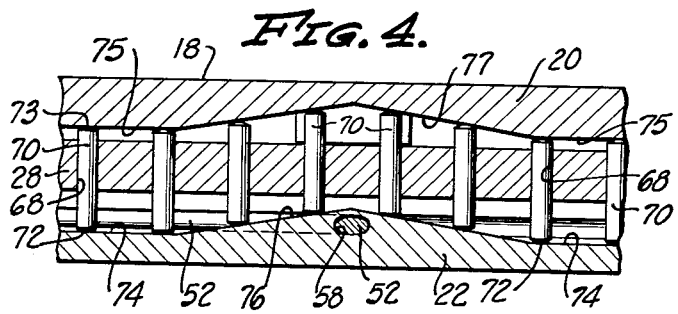
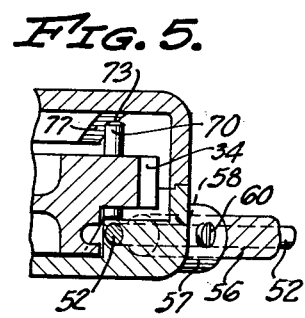
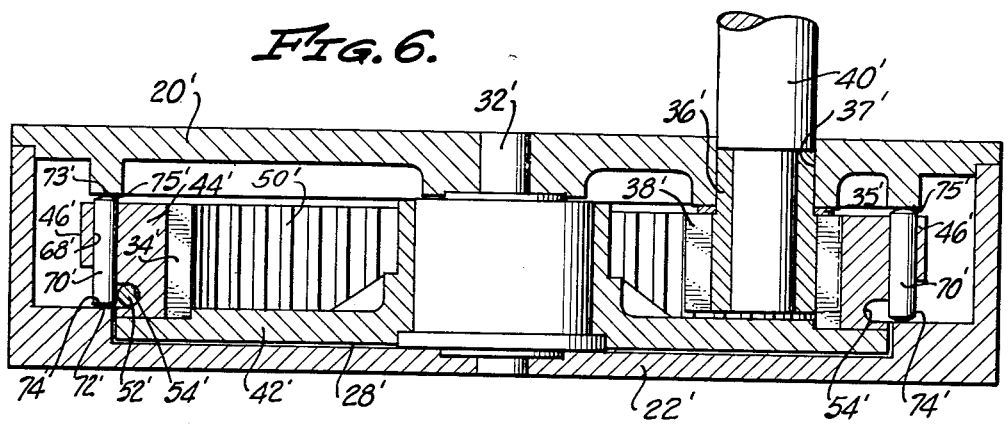
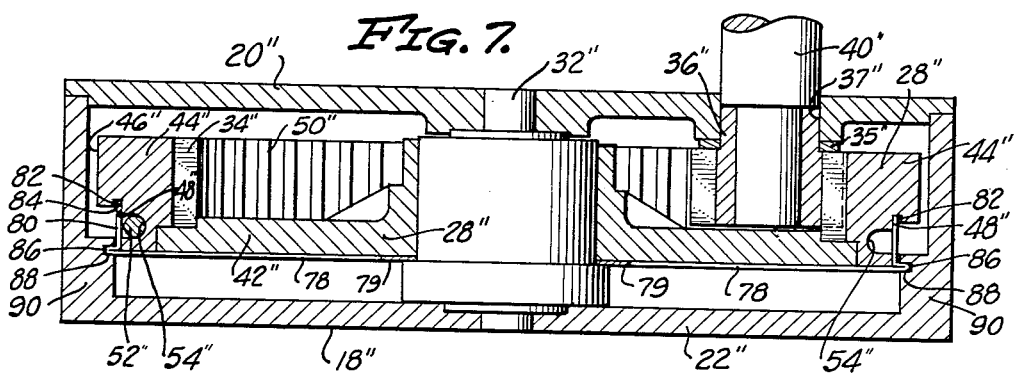
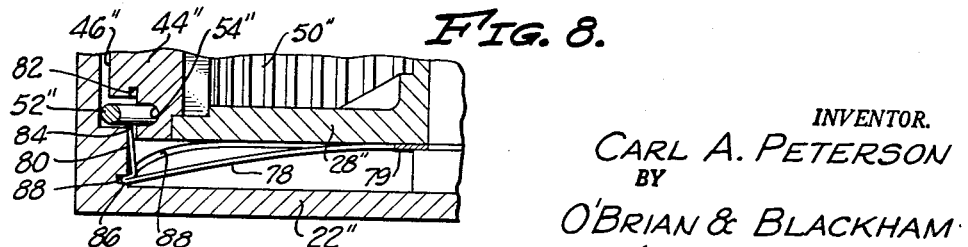
INVENTOR.
CARL A. PETERSON
BY
O'BRIAN & BLACKHAM
ATTORNEYS United States Patent Office 3,131,909
Patented May 5, 1964

3,131,909
REMOTE CONTROL STEERING DEVICE
Carl A. Peterson, Redondo Beach, Calif., assignor to Captain Products, Inc., Redondo Beach, Calif., a corporation of California
Filed June 5, 1961, Ser. No. 114,929
3 Claims. (Cl. 254—175.5)

This invention relates to remote control steering devices. More particularly, the invention relates to improvements in steering mechanisms which translate between rotary movement of gear and reciprocal longitudinal movement of a flexible shaft or cable, such as, for example, a control cable of conventional Bowden wire type.

The effectiveness and utilization of prior devices of this general character, particularly in the boat steering field, have been limited by problems of friction and wear on the cable where it is associated with the rotary gear means. These problems have arisen from the difficulty of maintaining the flexible shaft or cable at all times in effective contact with the gear. In the situation when the gear is being rotated so as to "pull" the cable (i.e., to wind more of the cable upon the periphery of the gear) or, in the case where the force is being applied from the cable end of the system, when the cable is being "pulled" so as to unwind the cable from around the periphery of the gear, there has been relatively less difficulty in maintaining the cable in operative contact around the periphery of the gear. However, in the situation when the gear is rotated so so as to "push" the cable (i.e., so as to unwind the cable from the periphery of the gear) or, in the case where the force is being applied from the cable end of the system, when the cable is being "pushed" so as to wind more cable around the periphery of the rotary gear, there has been relatively greater difficulty in maintaining the cable in operative alignment around the periphery of the gear. The tendency of the cable in this latter situation is simply to go slack and move away from the periphery of the gear so as to limit or negate effective translation between the reciprocal longitudinal movement of the cable and the rotary movement of the gear. Prior art devices which have sought to limit these undesirable results by providing for engagement of the cable in this latter situation with bearing surfaces or other means on the interior of a housing or casing surrounding the gear and the cable have been limited in their effectiveness by "bunching" of the cable and/or by friction or "binding" between the moving cable and the bearing means on the interior of the housing or casing.

A further related problem encountered with prior devices of this general character has been in the friction and wear associated with the prior art structures and means for leading the cable or flexible shaft away from the rotary gear. These structures have usually of necessity provided for leading the flexible shaft or cable away from the rotary gear at an angle to the rotary gear, thereby creating at least one point at which the cable or shaft must bend past a bearing surface of some sort, thus causing friction and wear at this bending point.

There has been need, particularly in the boat steering field, for an efficient construction which effectively avoids these problems.

It is a general object of this invention to meet this need. A further general object of the invention is to provide a remote control steering device for conversion between rotary gear movement and reciprocal longitudinal movement of a flexible shaft which is durable and relatively inexpensive to make and which provides prompt positive response in both directions of such translation of movement. A further object of the invention is to provide a remote control steering device including rotary gear means, and flexible shaft or cable means engaging such gear means, in which friction and wear on such shaft or cable is substantially eliminated. A more specific object of the invention is to provide such a device in which the flexible shaft or cable may be led away from, or fed to, the rotary gear means tangentially without friction or bending in any direction. Other objects and advantages of the invention will appear more fully from the remainder of this description, including the appended claims and the accompanying drawings, in which:

FIG. 1 is a perspective view of a boat employing the present invention;

FIG. 2 is a cross-sectional view taken along the line 2—2 of FIG. 1;

FIG. 3 is a sectional view taken along the line 3—3 of FIG. 2;

FIG. 4 is an enlarged, fragmentary, detailed cross-sectional view taken at line 4—4 of FIG. 3;

FIG. 5 is an enlarged, fragmentary, detailed sectional view taken on line 5—5 of FIG. 3;

FIG. 6 is a cross-sectional view, similar to FIG. 2, of a modified form of the invention;

FIG. 7 is a cross-sectional view, similar to FIG. 2, of another modified form of the invention; and FIG. 8 is a fragmentary view of the form of the invention shown in FIG. 7, illustrating the manner in which the flexible shaft or cable is led away from the rotary gear.

In all figures of the drawings like numerals are used to designate like parts where convenient for purposes of illustration and explanation. The accompanying drawings are not to be taken as limiting this invention; those skilled in the art to which this invention pertains will realize that these drawings are intended to illustrate the nature of the invention and to designate clearly preferred embodiments of this invention. Obviously the dimensions and relative sizes of the various parts of the construction shown can be changed to adapt the invention for different uses and conditions.

As an aid to understanding the invention it may be stated in summary form that it concerns remote control steering devices in which a flexible shaft or cable is anchored at one end on a curved face of a rotary gear and disposed so as to be capable of being wound around the gear on this curved surface when the gear is rotated, in which means for retaining the shaft or cable adjacent the curved face of the gear are connected with the gear so as to rotate with the gear in substantially fixed relationship with the gear and wherein cam means for moving the retaining means away from the shaft or cable are located at the area where the cable or shaft extends away from the gear for connection with steering or rudder means. The invention is further summarized in the appended claims.

The presently preferred form of conventional flexible shaft or cable used with the invention is the Bowden wire type in which a tubular sheath is rigidly mounted at both ends and the control cable or flexible shaft is slidably contained within the sheath. One end of the sheath is mounted adjacent the remote control steering device of the invention and the other end is rigidly mounted adjacent the steering control means or the rudder or other means to be controlled. The length of the cable-containing sheath between its ends may be curved in any desired directions for convenient mounting, although, of course, it is preferred to keep such curving to a minimum since it tends to increase frictional resistance to longitudinal movement of the cable within the sheath. The end of the cable at the end of the sheath remote from the remote control steering device of the invention is preferably attached directly to a rigid member, in the conventional manner, connecting it to a simple lever of any kind so that reciprocal longitudinal movement of the cable turns or moves the lever, which in turn is connected to, or forms a part of, a rudder or other steering means.

In the drawings, FIG. 1 illustrates a conventional motorboat 10 in which the invention may be employed to advantage. A conventional outboard motor 12, including rudder means 13, is mounted at the rear of the boat 10. The conventional steering wheel 14, mounted in the forward part of the boat 10, is connected by the steering wheel shaft 16 to a remote control steering device 17 of the invention. The steering device 17 of the invention is operatively connected by a flexible shaft or control cable 42 to the motor 12 and rudder means 13 so that reciprocal longitudinal movement of the cable 52 turns the motor 12 and rudder means 13 to provide steering action.

The remote control steering device of invention 17 comprises a housing 18, which is preferably an oil-tight casing formed of two parts 20 and 22 which may be joined together as by screw means 24 across aligned flange portions 26 on each of parts 20 and 22. In use of the invention, the housing 18 preferably is filled or bathed with lubricating oil.

A rotary gear wheel or rotor 28 is mounted by any suitable means, such as bearings 30 formed in housing 18 for engaging axial shaft means 32 of the gear 28, for rotation about its axis through at least part of a circle. Gear teeth 34 on the gear 28 mesh with the teeth 38 of a pinion gear 36. The shaft 40 of the pinion gear 36, journalled through bearings 35 and apertures 37 in housing 18, is connected to the shaft 16 of the steering wheel 14; preferably they form a common shaft.

The gear 28 comprises relatively thin radial portion 42 connecting the shaft means 32 with the relatively thick annulus or rim portion 44. The annulus or rim 44 has concentric outer face portion 46 and peripheral face 48. The peripheral face 48 is recessed from the outer face 46 so as to have a smaller radius from the center of rotation of the gear 28 than the outer face 46. Gear face 50 of the rotary gear or rotor 28, as illustrated in FIG. 2, may be formed on only a portion of the outer face 46 if limited rotation of the gear 28 is all that is desired or needed. Similarly outer face 46 and annulus 44 may be formed as portions of a circle instead of a complete circle; preferably, however, they form a complete circle.

The peripheral face 48 has a peripheral groove or channel means 54 formed therein. A flexible shaft or control cable 52 is secured at one end 62 to the gear 28 so as to be anchored at a point 63 on the peripheral face 48 of the gear 28.

The end 62 of the cable 52 may be secured directly to the peripheral face 48 of the gear 28 at the point 63 by spot welding or the like; preferably, however, with an external gear face 50 as illustrated in FIG. 2, the cable 52 is led through a radial hole 64 in the annulus 44 and secured by clamp means 66, closely adjacent the annulus 44, to the radial portion 42 of the gear 28.

The tubular sheath 56 is secured by screw means 60 to boss means 57 surrounding hole 58 in the housing 18. The hole 58 is formed in the same plane as the peripheral face 48 so as to be tangentially aligned with the peripheral face 48 of the gear 28.

The cable 52 at the point 63 lies in the peripheral groove 54 and extends around the peripheral face 48 to the point 65 with which the hole 58 in the housing 18 is tangentially aligned, at which point 65 the cable 52 extends tangentially away from the peripheral face 48 through the hole 58 and the tubular sheath 56. Boss means 57 and hole 58 thus serve as means for channeling or guiding cable 52 between peripheral groove 54 and sheath 56.

The cable 52 is retained in the groove 54 between points 63 and 65 by means of pins 70 slidably mounted in slots 68, extending transversely to the plane of rotation of gear 28 through the outer face 46 of the gear 28. Pins 70 in slots 68 are spaced around the periphery of the gear 28 outwardly of the groove 54 in the peripheral face so as to be capable of engaging the cable 52 if it tends to move outwardly from the groove 54. The pins 70 are preferably cylindrical pins having rounded ends 72 and 73 to reduce friction. The ends 72 of the pins 70 are adapted to ride on the cam surface 74 formed on the housing 18, thus acting in effect as cam follower means.

The cam surface 74, which is generally in a plane parallel with the groove 54 and located adjacent or slightly beyond the side of the groove 54 remote from outer face portion 46 of gear 28, has a raised portion 76 aligned with the point 65 (at which the cable 54 is led away from the gear 28) and the tangentially aligned hole 58. The raised portion 76 of the cam surface 74, as illustrated in FIG. 4, forms in effect an ascending and descending ramp over the hole 58.

The side of the housing 18 opposite cam surface 74 is preferably formed to include an opposed cam surface 75 which is parallel with cam surface 74 and spaced away from cam surface 74 so that it is closely adjacent the ends 73 of the pins 70 when the pins 70 are riding on the cam surface 74; thus the opposed cam surface 75 has an indentation 77 corresponding to the raised portion 76 of cam surface 74.

In operation of the remote control steering device 17, as the cable 52 moves longitudinally away from the gear 28, the gear 28 rotates and the pins 70 adjacent any given section of the cable 52, being carried in slots 68 in the gear 28, follow the raised portion 76 of cam surface 74 as the given section of cable 52 approaches the point 65 of tangency to the gear 28. As the pins 70 follow or ride up the raised portion 76, or the corresponding portion 77 of the opposed cam surface 75, they move away from the given sections of the cable 52 and release it from the groove 54 as it is led away from the gear 28 tangentially through the hole 58 into the tubular sheath 56, with no bending whatever of the cable 52 and without the friction or wear associated with bending past a surface of any kind. The same action in reverse occurs when the cable 52 moves longitudinally toward the gear 28. In either direction of movement, if the cable 52 is being "pushed" under compression rather than "pulled" under tension it is held in the groove 54 between points 63 and 65, without "bunching" or "binding" by the pins 70. Since the pins 70 move in rotation in alignment with the adjacent portions of the cable 52, there is no relative movement between the pins 70 and the cable 52, and thus no friction or wear between them. This provides both easy movement and prompt and precise response to movements or forces in either direction.

FIG. 6 illustrates a modified form of the invention in which gear face 50' of gear 28' is formed on the interior surface of rim 44' and in which shaft means 40' of pinion gear 36' are journalled in bearing means 35' and aperture 37' of housing 18' within the circumference of gear 28' so that pinion gear teeth 38' mesh with the internal teeth 34' of gear 28'. The gear 28' is rotatably mounted by shaft means 32', and the radial portion 42' of the gear 28' is located adjacent the side of the housing 18' so as to provide room for the internal gear face 50'. In other respects the form of the invention illustrated in FIG. 6 and the elements of it, indicated by primes of their numerals as illustrated in FIGS. 1 through 5, are formed and function, as those skilled in the art will understand, in the same manner as hereinbefore described and such description is not repeated. The form of the invention illustrated in FIG. 6 is employed to particular advantage where the compactness of size of the device 17 is particularly desired.

FIGS. 7 and 8 illustrate another modified form of the invention, generally similar in gearing and cable arrangement to the form of the invention illustrated in FIG. 6 but differing in the form of the means for retaining the cable adjacent the gear, in which the elements of the invention, indicated by double primes of their numerals as illustrated in the preceding figures of the drawings, are formed and function, as those skilled in the art will understand, in the same manner as hereinbefore described.

The rotary gear or rotor 28″ is rotatably held by shaft means 32″ so that the side of gear 28″ nearest groove 54″ is spaced away from the adjacent side of housing 18″. Radial fingers 78 mounted at their inner ends 79 on this side of rotary gear 28″ adjacent the center of rotary gear 28″ serve as the means for retaining cable 52″ in the groove or channel means 54″. The radial finger means 78 as mounted on gear 28″ are somewhat flexible transversely of the plane of rotation of gear 28″; they may be formed simply and economically as a spider by stamping of resilient spring metal. The fingers 78 are bent at their outer ends to form transverse flanges 80 substantially parallel with peripheral face 48″ of gear 28″. These end portions or flanges 80 of the finger 78 are located adjacent the peripheral face 48″ of the gear 28″ so as to normally extend across the groove 54″ and to be capable of holding the cable 52″ in the groove 54″. A transverse groove or slot 82 in the side of outer face portion 46″ of rotary gear 28″ adjacent groove 54″ is located outwardly of, and immediately adjacent, peripheral face 48″ so as to be capable of receiving the outer ends 84 of radial fingers 78 so as to hold flanges 80 against outward movement.

Radial fingers 78 include projections or flanges 86 extending outwardly beyond flanges 80. Projections 86 may be formed simply as crimps in radial fingers 78 at the point where fingers 78 are bent to form vertical flanges 80. Projections 86 extend into groove 88 in the inner side of end wall 90 of housing 18″. As gear 28″ rotates the projections 86, acting in effect as cam follower means, ride within the groove 88, acting as cam means.

The groove 88 controls the positioning of flanges 80 of radial fingers 78 in a manner analagous to that in which cam surface 74 controls the positioning of pins 70 in the preceding forms of the invention. As illustrated in FIG. 7, except in the area where cable 52″ extends tangentially away from gear 28″ out from the housing 18″ (in the same manner as illustrated in FIGS. 3 and 5), groove 88 is located so as to hold flange 80 across groove 54″ with the end 84 of radial finger 78 in transverse slot 82. As illustrated in FIG. 8, in the area where cable 52″ extends tangentially away from gear 28″, upon rotation of gear 28″ groove 88 serves to release cable 52″ from groove 54″ by engaging projection 86 on radial finger 78 and guiding it away from the side of gear 28″ so as to move or bend radial finger 78 and its flange 80 away from the cable 52″ and into the aforementioned space between the side of gear 28″ and the side of housing 18″. The path of groove 88 around the circumference of housing 18″ is thus a mirror image of the path of cam surface 74 of the preceding forms of the invention, being in a plane parallel with groove 54″ except for a descending and ascending portion where the cable 52″ extends tangentially away from gear 28″, which is the inverse of the ascending and descending portion of the path of cam surface 74 at raised portion 76. Fingers 78 ride in groove 88 substantially without engagement or friction with groove 88, except in this area illustrated in FIG. 8.

Without further elaboration, the foregoing will so fully explain my invention, that others may, by applying current knowledge, readily adapt the same, including its inherent reliability, economy, and durability, for use under various conditions of service.

I claim:
1. In combination:
a housing;
wheel means rotatably mounted within said housing so as to be capable of being rotated about an axis, said wheel means having a peripheral groove formed therein, said groove opening radially outwardly and having a groove bottom radially inwardly of said wheel means;
means for rotating said wheel means extending into the interior of said housing and engaging said wheel means;
tubular guide means located on said housing so as to terminate adjacent to said groove, said tubular guide means extending from said housing tangentially to the periphery of said groove in the same plane as said groove;
flexible cable means having substantial column strength, one end of said flexible cable means being secured to said wheel means so that said cable means is located within said groove within the interior of said housing and extends out of said housing through said guide means, said groove being of such axial width that only a single length of said flexible cable means can be located therein;
a plurality of retainer means for holding said cable within said groove mounted on said wheel means, each of said retainer means being movable with respect to said groove and normally extending across said groove radially outwardly of the bottom of said groove that only a single length of said flexible cable means can be located therebetween, only a single length of said flexible cable means thus being positionable within said groove, said flexible wire cable means being engaged on its radially outward side by side retainer means; and
cam means engaging said retainer means for moving said retainer means from across said groove adjacent to said guide means during rotation of said wheel means.
2. In the combination defined in claim 1, a plurality of holes extending through the periphery of said wheel means, each of said holes terminating adjacent to the open end of said peripheral groove, and wherein said retainer means comprise a plurality of pins, each of said pins being located within one of said holes, said pins being normally located entirely across said groove in an axial direction and being capable of being moved with respect to said groove, and wherein said cam means comprise cam surfaces formed within the interior of said housing, the ends of said pins engaging said cam surfaces.
3. The combination defined in claim 1 wherein said retainer means are finger means, said finger means being mounted on said wheel means so as to be movable therewith, each of said finger means being capable of being moved so as to uncover a portion of said groove, each of said finger means including a part serving as a cam follower, and wherein said parts serving as cam followers are engaged by said cam means.

References Cited in the file of this patent

UNITED STATES PATENTS

| | | |
|---|---|---|
| 46,110 | Jackson | Jan. 31, 1865 |
| 340,229 | Masters | Apr. 30, 1886 |
| 1,002,762 | Saunders | Sept. 5, 1911 |
| 2,326,443 | Dillon | Aug. 10, 1943 |
| 2,726,062 | Sherwood | Dec. 6, 1955 |
| 2,917,279 | Arnold | Dec. 15, 1959 |
| 2,947,194 | Shimanckas | Aug. 2, 1960 |